United States Patent
Tokunaga et al.

(10) Patent No.: US 10,324,472 B2
(45) Date of Patent: Jun. 18, 2019

(54) VEHICLE CONTROL DEVICE

(71) Applicant: HONDA MOTOR CO., LTD., Minato-ku, Tokyo (JP)

(72) Inventors: Shion Tokunaga, Wako (JP); Fumio Hamano, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/937,944

(22) Filed: Mar. 28, 2018

(65) Prior Publication Data

US 2018/0284799 A1   Oct. 4, 2018

(30) Foreign Application Priority Data

Mar. 31, 2017   (JP) ................. 2017-071768

(51) Int. Cl.
  G05D 1/02    (2006.01)
  G05D 1/00    (2006.01)
  B60W 30/12   (2006.01)
  G06K 9/00    (2006.01)

(52) U.S. Cl.
  CPC ........... G05D 1/0234 (2013.01); B60W 30/12 (2013.01); G05D 1/0088 (2013.01); G05D 1/0246 (2013.01); G06K 9/00798 (2013.01)

(58) Field of Classification Search
  CPC .. G05D 1/0088; G05D 1/0234; G05D 1/0246; G06K 9/00; G06K 9/00791; G06K 9/00798; G08G 1/167; B60T 8/17557; B60W 30/10; B60W 30/12
  See application file for complete search history.

(56) References Cited

U.S. PATENT DOCUMENTS

| 9,286,523 | B2* | 3/2016 | Guan ................. G06K 9/00798 |
| 2003/0072471 | A1* | 4/2003 | Otsuka ................ G05D 1/0246 382/103 |
| 2009/0118994 | A1* | 5/2009 | Mori .................. G06K 9/00798 701/117 |
| 2011/0222732 | A1* | 9/2011 | Higuchi ............... B60W 30/14 382/104 |
| 2012/0215377 | A1* | 8/2012 | Takemura ............ B60W 30/12 701/1 |

(Continued)

FOREIGN PATENT DOCUMENTS

| JP | 2008-049918 | 3/2008 |
| JP | 2000-207692 | 7/2008 |

(Continued)

*Primary Examiner* — Thomas G Black
*Assistant Examiner* — Ce Li Li
(74) *Attorney, Agent, or Firm* — Amin, Turocy & Watson LLP

(57) ABSTRACT

A vehicle control device includes a lane shape acquisition unit which acquires lane shape data of a lane of a predetermined region from map information, at a stage at which a host vehicle has arrived at the predetermined region or prior to the host vehicle arriving at the predetermined region, a peripheral image acquisition unit which acquires peripheral image data including lane markings of the predetermined region, and a lane marking selection unit which collates the acquired lane shape data with the peripheral image data, and from within the peripheral image data, selects lane markings to be used at least for lane keeping.

8 Claims, 12 Drawing Sheets

(56) References Cited

U.S. PATENT DOCUMENTS

| | | | | |
|---|---|---|---|---|
| 2016/0152237 A1* | 6/2016 | Takahashi | ............ | B60W 30/02 |
| | | | | 701/41 |
| 2016/0314358 A1* | 10/2016 | Kushida | ............. | G06K 9/00798 |
| 2017/0008521 A1* | 1/2017 | Braunstein | ............. | G01C 21/32 |
| 2018/0181818 A1* | 6/2018 | Shimotani | ............... | G01S 7/412 |
| 2018/0273031 A1* | 9/2018 | Fujita | ................ | G01C 21/3667 |

FOREIGN PATENT DOCUMENTS

| | | |
|---|---|---|
| JP | 2008-149860 | 7/2008 |
| JP | 2010-072973 | 4/2010 |
| JP | 2016-206868 | 12/2016 |

\* cited by examiner

POINT Pa

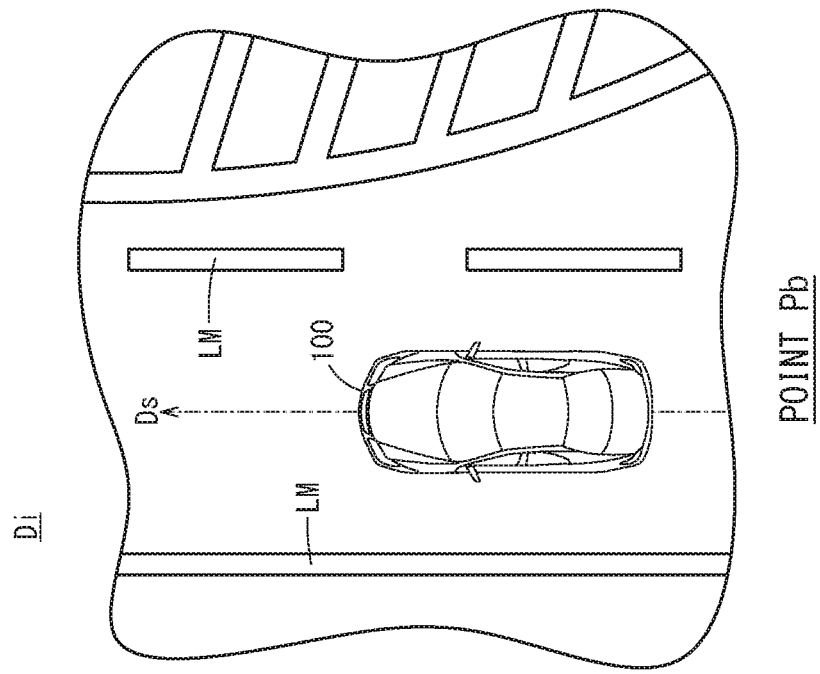
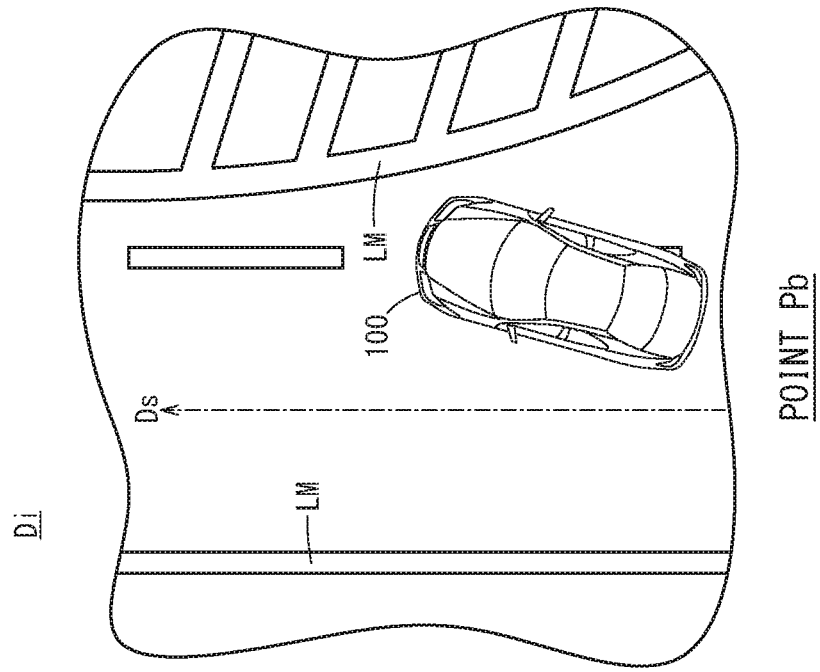

VEHICLE CONTROL DEVICE

CROSS-REFERENCE TO RELATED APPLICATION

This application is based upon and claims the benefit of priority from Japanese Patent Application No. 2017-071768 filed on Mar. 31, 2017, the contents of which are incorporated herein by reference.

BACKGROUND OF THE INVENTION

Field of the Invention

The present invention relates to a vehicle control device which at least partially automatically carries out a travel control for a host vehicle.

Description of the Related Art

In Japanese Laid-Open Patent Publication No. 2008-149860, a task is addressed in which a travel control is performed on the basis of detection results corresponding respectively to a plurality of types of vehicle travel controls.

In order to achieve such a task, according to Japanese Laid-Open Patent Publication No. 2008-149860, without the priorities of sensors being fixed in relation to all of the travel controls, the priorities are set corresponding respectively to the types of travel controls, and respective LKA (Lane Keeping Assist) units or the like control the vehicle by applying detection results of the respective sensors in accordance with the set priorities.

In Japanese Laid-Open Patent Publication No. 2008-049918, a task is addressed in which an appropriate control is performed by detecting whether or not recognition of a road partition line is being performed correctly.

In order to achieve such a task, according to Japanese Laid-Open Patent Publication No. 2008-049918, a storage unit in which map information is stored, and a current position specifying unit in which a current position of the host vehicle is specified are provided. A control is performed during a predetermined deviation, based on a deviation between first index information derived as a result of a road partition line recognition unit having recognized the road partition line, and second index information obtained with reference to map information using the present position of the host vehicle as specified by the current position specifying unit.

SUMMARY OF THE INVENTION

In the lane keeping assist control disclosed in Japanese Laid-Open Patent Publication No. 2008-149860, lane information detected by an image sensor that detects white lines is given a first priority, and when lanes cannot be detected, information for the control is supplemented with information in accordance with a navigation system or information provided by a radar device.

In Japanese Laid-Open Patent Publication No. 2008-049918, a road curvature (first index information) derived from a captured image of a camera is compared with a road curvature (second index information) acquired from the map information, and if the difference between the curvatures is greater than or equal to a threshold value, an automated steering control is stopped.

However, at an intersection or the like, with respect to a lane in which the vehicle is intended to travel, when the lane markings are recognized by a camera, if there are a plurality of branching lanes and the shapes of the lanes are complicated, cases occur in which it is impossible to identify and recognize the lane intended for travel.

The present invention has been devised with the aim of solving the aforementioned problems, and has the object of providing a vehicle control device in which lanes intended for travel can be identified and recognized, even at intersections or the like in which, with respect to a lane in which the vehicle is intended to travel, when the lane markings are recognized by a camera, a plurality of branching lanes exist and the shapes of the lanes are complicated.

[1] A vehicle control device according to an aspect of the present invention is characterized by a vehicle control device configured to carry out a travel control for a host vehicle at least partially automatically, including a lane shape acquisition unit configured to acquire, within a preset planned travel route, lane shape data (route data) of a predetermined region from map information, at a stage at which the host vehicle has arrived at the predetermined region or prior to the host vehicle arriving at the predetermined region, a peripheral image acquisition unit configured to acquire peripheral image data including lane markings of the predetermined region, and a lane marking selection unit configured to collate (align) the acquired lane shape data with the peripheral image data, and to select, from within the peripheral image data, lane markings to be used at least for lane keeping.

For example, at an intersection, with respect to a lane in which the vehicle is intended to travel, when lane markings are recognized by a camera, if there are a plurality of branching lanes and the shapes (paths) of the lanes are complicated, cases occur in which it is impossible to identify and recognize the lane intended for travel. However, according to the present invention, when the host vehicle arrives at the predetermined region or prior to the host vehicle arriving at the predetermined region, the lane shape data of the predetermined region is acquired from the map information, and peripheral image data is acquired including a plurality of lane markings of the predetermined region. In addition, the acquired lane shape data is collated with the peripheral image data, and from within the peripheral image data, lane markings to be used at least for lane keeping are selected. More specifically, the lane markings along the lane intended for travel are specified. Consequently, even if a plurality of branching lanes exist and the shapes of the lanes are complicated, it is possible to identify and recognize the lane markings to be used at least for lane keeping.

More specifically, in the present invention, at an intersection or the like, with respect to a lane in which the vehicle is intended to travel, when the lane markings are recognized by a camera, even if there are a plurality of branching lanes and the shapes of the lanes are complicated, it is possible to identify and recognize only the lane intended for travel.

Incidentally, striped zebra zones (buffer zones) in which a plurality of straight lines are arranged in parallel, or a quadrangular marking (diamond marking) is drawn on the road accompanying the lanes in certain cases. In such a case, there is a concern that the path of the vehicle may deviate from the planned travel route by mistaken recognition of one of the straight lines constituting the zebra zone or one of the straight lines constituting the diamond markings as a lane marking.

Even in such a case, since the acquired lane shape data is collated with the peripheral image data, and from within the peripheral image data, lane markings along the lane intended for travel are selected, even if there is misleading straight line data in the peripheral image data, it is possible to identify and recognize only the lane markings to be used at least for lane keeping. Consequently, it is possible to enhance the merchantability of vehicles that carry out a travel control for the host vehicle at least partially automatically.

[2] In the aspect of the present invention, the lane marking selection unit may include a first information acquisition unit configured to, based on the peripheral image data, acquire, as first information, a combination of the number of lane markings on the left side of the shape data in the predetermined region and the number of lane markings on the right side of the shape data in the predetermined region, and a second information acquisition unit configured to, based on the peripheral image data, acquire, as second information, a combination of the number of lane markings on the left side of the host vehicle in the predetermined region and the number of lane markings on the right side of the host vehicle in the predetermined region. In the case that the first information and the second information are the same, the lane marking selection unit may select, from within the peripheral image data, at least one of the lane markings on both left and right sides of the host vehicle as the lane markings to be used at least for lane keeping, and in the case that the first information and the second information are different, the lane marking selection unit may select, from within the peripheral image data, at least one of lane markings closest to the shape data as the lane markings to be used at least for lane keeping.

In selecting the lane markings, since it is possible to select the lane markings to be used at least for lane keeping on the basis of the combination of the numbers of lane markings, and without directly using information composed of a large amount of data such as image data, even with a complicated lane structure having a plurality of lanes, the search for the lane markings can be effected at high speed.

[3] In the aspect of the present invention, the lane marking selection unit may select, from within the peripheral image data, the lane markings to be used at least for lane keeping on the basis of the degree of a curve approximation expression of the shape data in the predetermined region.

In accordance with this feature, it is possible to easily determine the course (a left turn, a right turn, forward traveling, etc.) of the lane intended for travel, without directly using information composed of a large amount of data such as image data, and therefore, even with a complicated lane structure having a plurality of lanes, the search for the lane markings can be effected at high speed.

[4] In the aspect of the present invention, the predetermined region in which the host vehicle travels may be a region in which three or more pieces of image data of a line shape can be recognized.

As the region (predetermined region) in which three or more pieces of image data of a line shape can be recognized, there may be cited, for example, two lane markings for forward traveling, and one lane marking for making a right turn, or the like. In addition, for example, in the case that the host vehicle should travel straight forward, two lane markings (image data) for forward traveling can be selected without erroneously recognizing lane markings (image data) for making a right turn as the lane markings (image data) for forward traveling. This feature applies in a similar manner to a case in which the host vehicle makes a right turn, or a case in which the host vehicle makes a left turn.

As other examples of the predetermined region, as described above, there may be cited regions in which striped zebra zones (buffer zones), or quadrangular diamond markings are drawn. Even in the case of such a predetermined region, the acquired lane shape data is collated with the peripheral image data, and within the peripheral image data, the lane markings along the lane intended for travel are selected as the lane markings to be used at least for lane keeping.

Consequently, even if there are image data of misleading line shapes in the peripheral image data, it is possible to identify and recognize only the lane markings to be used at least for lane keeping. As a result, it is possible to enhance the merchantability of vehicles that carry out a travel control for the host vehicle at least partially automatically.

[5] In the aspect of the present invention, the lane shape acquisition unit may recognize, as the predetermined region, a region in which the number of lanes changes within the preset planned travel route, and may acquire the lane shape data in the predetermined region from the map information prior to the host vehicle arriving at the predetermined region.

From the fact that the shape data is acquired prior to reaching the predetermined region, it is possible to implement the selection process for selecting the lane markings to be used at least for lane keeping from a point in time of having entered into the predetermined region. In particular, such a feature is advantageous in the case of acquiring a curve approximation expression of the shape data or the like.

[6] In the aspect of the present invention, while the host vehicle is traveling, the lane shape acquisition unit may acquire, from the map information, information of the number of lanes of a region in which the host vehicle is traveling, and at a stage at which the number of lanes has changed, may recognize that the host vehicle has arrived at the predetermined region, and acquire the lane shape data of the predetermined region from the map information.

The predetermined region is identified while acquiring the information of the number of lanes of the region in which the host vehicle is traveling, and therefore, the amount of communications performed each and every time until arriving at the predetermined region can be reduced, and the computation time can also be shortened.

In accordance with the vehicle control device according to the present invention, at an intersection or the like, with respect to a lane in which the vehicle is intended to travel, when the lane markings are recognized by a camera, even if there are a plurality of branching lanes and the shapes of the lanes are complicated, it is possible to identify and recognize only the lane intended for travel.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6A is a plan view showing peripheral image data corresponding to the point Pb in FIG. 3 in the case that the host vehicle is traveling too close to a right lane marking;

FIG. 6B is a plan view showing peripheral image data corresponding to the point Pb in FIG. 3 in the case that the host vehicle is traveling straight forward (the display of the host vehicle is shown as a reference);

DESCRIPTION OF THE PREFERRED EMBODIMENTS

An exemplary embodiment of a vehicle control device according to the present invention will be presented and described in detail below with reference to FIGS. 1 through 12.

Figure 1:
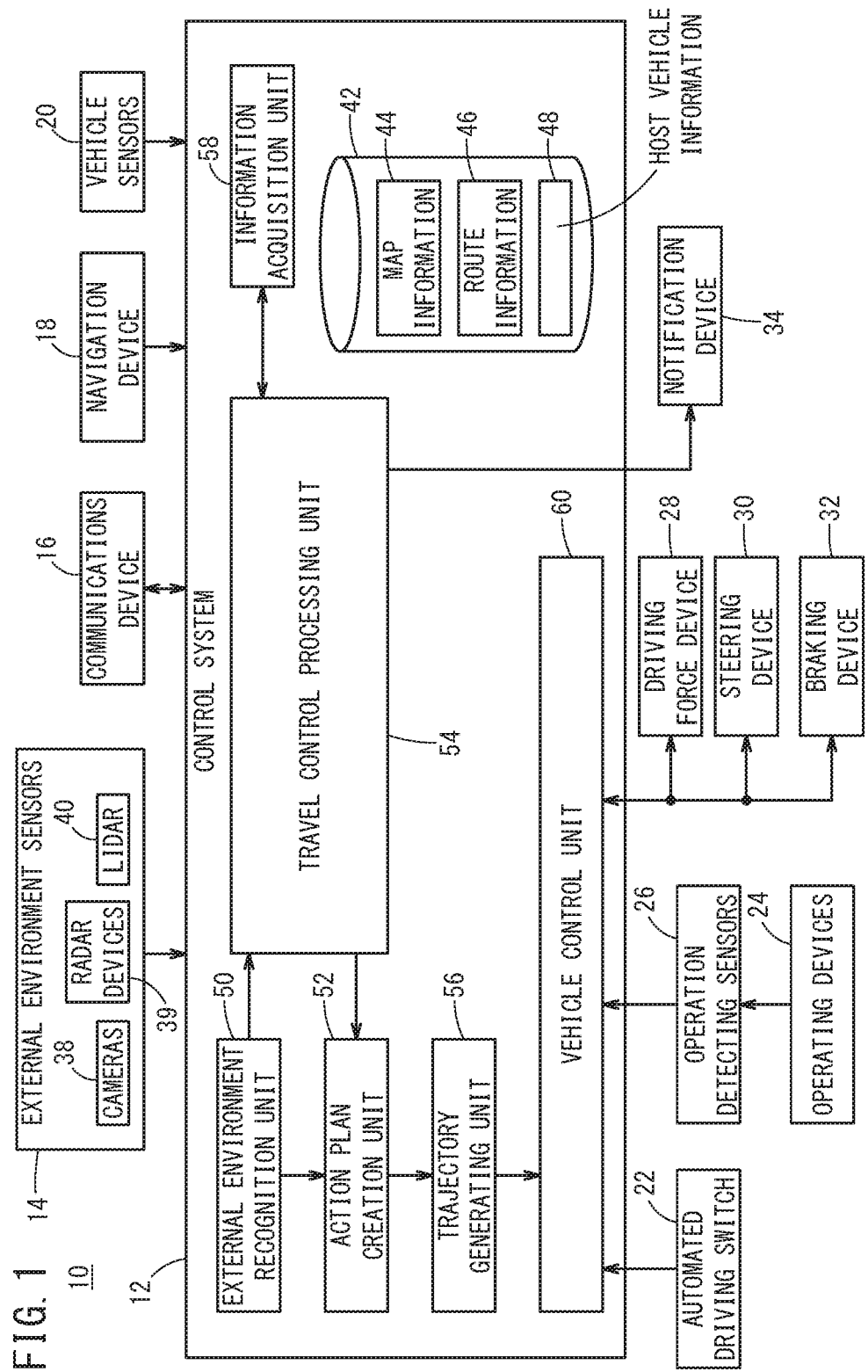
FIG. 1 is a block diagram showing a configuration of a vehicle control device according to an embodiment of the present invention.

FIG. 1 is a block diagram showing a configuration of a vehicle control device 10 according to an embodiment of the present invention. The vehicle control device 10 is incorporated in a driver's own vehicle 100 (referred to as a "host vehicle", see FIG. 3) and performs a travel control for the vehicle by way of automated driving or manual driving. In this case, the term "automated driving" implies a concept that includes not only "fully automated driving" in which the travel control for the vehicle is performed entirely automatically, but also "partial automated driving" in which the travel control is partially performed automatically.

As shown in FIG. 1, the vehicle control device 10 is basically made up from an input system device group, a control system 12, and an output system device group. The respective devices of the input system device group and the output system device group are connected via communication lines to the control system 12.

The input system device group includes external environment sensors 14, a communications device 16, a navigation device 18, vehicle sensors 20, an automated driving switch 22, and operation detecting sensors 26 connected to operating devices 24.

The output system device group includes a driving force device 28 for driving the vehicle wheels (not shown), a steering device 30 for steering the vehicle wheels, a braking device 32 for braking the vehicle wheels, and a notification device 34 for notifying the driver primarily through visual and auditory sensation.

The external environment sensors 14 acquire information (hereinafter referred to as external environmental information) indicative of the state of the external environment around the vehicle, and output the acquired external environmental information to the control system 12. More specifically, the external environment sensors 14 are configured to include a plurality of cameras 38, a plurality of radar devices 39, and a plurality of LIDAR devices 40 (Light Detection and Ranging; Laser Imaging Detection and Ranging).

The communications device 16 is configured to be capable of communicating with external devices including roadside devices, other vehicles, and a server, and transmits and receives, for example, information related to transportation facilities, information related to other vehicles, probe information (including traffic congestion information), and most recent map information 44, etc. The map information 44 is stored in a predetermined memory area of a storage device 42, or alternatively, in the navigation device 18.

The navigation device 18 is constituted to include a satellite positioning device, which is capable of detecting a current position of the vehicle, and a user interface (for example, a touch-panel display, a speaker, and a microphone). Based on the current position of the vehicle or a position designated by the user, while traveling in a given lane, the navigation device 18 calculates a route to a designated destination point or a route along roadways, and outputs the route to the control system 12. The route calculated by the navigation device 18 is stored as planned travel route information 46 in a predetermined memory area of the storage device 42.

The vehicle sensors 20 output to the control system 12 detection signals from respective sensors, including a speed sensor for detecting the travel speed V (vehicle velocity), an acceleration sensor for detecting an acceleration, a lateral G sensor for detecting a lateral G force, a yaw rate sensor for detecting an angular velocity about a vertical axis, an orientation sensor for detecting an orientation, and a gradient sensor for detecting a gradient of the vehicle. The detection signals are stored as host vehicle information 48 in a predetermined memory area of the storage device 42.

The automated driving switch 22, for example, is a pushbutton switch provided on the instrument panel. The automated driving switch 22 is configured to be capable of switching between a plurality of driving modes, by manual operation thereof by a user including the driver.

The operating devices 24 include an accelerator pedal, a steering wheel, a brake pedal, a shift lever, and a direction indication (turn signal) lever. The operation detecting sensors 26, which detect the presence or absence or the operated amounts of operations made by the driver, as well as operated positions, are attached to the operating devices 24.

The operation detecting sensors 26 output to a vehicle control unit 60 as detection results an amount by which the accelerator pedal is depressed (degree of accelerator opening), an amount (steering amount) by which the steering wheel is operated, an amount by which the brake pedal is depressed, a shift position, and a right or left turn direction, etc.

The driving force device 28 is constituted from a driving force ECU (Electronic Control Unit), and a drive source including an engine and/or a driving motor. The driving force device 28 generates a travel driving force (torque) for the vehicle in accordance with vehicle control values input thereto from the vehicle control unit 60, and transmits the travel driving force to the vehicle wheels directly or through a transmission.

The steering device 30 is constituted from an EPS (electric power steering system) ECU, and an EPS device. The steering device 30 changes the orientation of the wheels (steered wheels) in accordance with vehicle control values input thereto from the vehicle control unit 60.

The braking device 32, for example, is an electric servo brake used in combination with a hydraulic brake, and is made up from a brake ECU and a brake actuator. The braking device 32 brakes the vehicle wheels in accordance with vehicle control values input thereto from the vehicle control unit 60.

The notification device 34 is made up from a notification ECU, a display device, and an audio device. The notification device 34 performs a notifying operation in relation to automated driving or manual driving, in accordance with a notification command output from the control system 12 (and more specifically, a travel control processing unit 54 thereof).

In this instance, an "automated driving mode" and a "manual driving mode" (non-automated driving mode) are switched sequentially each time that the automated driving switch 22 is pressed. Instead of this feature, in order to provide confirmation of a driver's intention, it is possible to provide settings in which, for example, switching from the manual driving mode to the automated driving mode is effected by pressing twice, and switching from the automated driving mode to the manual driving mode is effected by pressing once.

The automated driving mode is a driving mode in which the vehicle travels under the control of the control system 12, in a state in which the driver does not operate the operating devices 24 (specifically, at least one from among the accelerator pedal, the steering wheel, and the brake pedal). Stated otherwise, in the automated driving mode, the control system 12 controls a portion or all of the driving force device 28, the steering device 30, and the braking device 32 in accordance with sequentially created action plans.

When the driver performs a predetermined operation using the operating devices 24 during implementation of the automated driving mode, the automated driving mode is canceled automatically, together with switching to a driving mode (which may include the manual driving mode) in which the level of driving automation is relatively low. Hereinafter, an operation in which the driver operates the automated driving switch 22 or any of the operating devices 24 in order to transition from automated driving to manual driving may also be referred to as an "override operation".

The control system 12 is constituted by one or a plurality of ECUs, and comprises various function realizing units in addition to the aforementioned storage device 42. According to the present embodiment, the function realizing units are software-based functional units, in which the functions thereof are realized by a CPU (central processing unit) executing programs stored in the storage device 42. However, the functions thereof can also be realized by hardware-based functional units made up from integrated circuits such as a field-programmable gate array (FPGA) or the like.

In addition to the storage device 42 and the vehicle control unit 60, the control system 12 is configured to include an external environment recognition unit 50, an action plan creation unit 52, a travel control processing unit 54, a trajectory generating unit 56, and an information acquisition unit 58.

Using various information input thereto from the input system device group (for example, external environmental information from the external environment sensors 14), the external environment recognition unit 50 recognizes lane markings (white lines) on both sides of the vehicle, and generates "static" external environment recognition information, including location information of stop lines and traffic signals, or travel enabled regions in which traveling is possible. Further, using the various information input thereto, the external environment recognition unit 50 generates "dynamic" external environment recognition information, including information concerning obstacles such as parked or stopped vehicles, traffic participants such as people and other vehicles, and the colors of traffic signals.

On the basis of recognition results from the external environment recognition unit 50, the action plan creation unit 52 creates action plans (a time series of events), and updates the action plans as needed. As types of events, for example, there may be cited events in relation to deceleration, acceleration, branching, merging, lane keeping, lane changing, passing other vehicles, and a road departure mitigation control. In this instance, "deceleration" and "acceleration" are events in which the vehicle is made to decelerate or accelerate. "Branching" and "merging" are events in which the vehicle is made to travel smoothly at a branching point or a merging point. "Lane changing" is an event in which the travel lane of the vehicle is made to change. "Passing" is an event in which the vehicle is made to overtake a preceding vehicle.

Further, "lane keeping" is an event in which the vehicle is made to travel without departing from the travel lane, and is subdivided based on a combination of travel modes. More specifically, as such travel modes, there may be included constant speed traveling, follow-on traveling, traveling while decelerating, traveling through a curve, or traveling to avoid obstacles. The "road departure mitigation control" recognizes a lane with a monocular camera, prompts the attention of the driver by a display and a vibration applied to the steering wheel when the host vehicle 100 is about to go outside of the lane, and in the case that an avoidance operation is not being performed, provides an assist to control the steering and restore the vehicle into the lane. Further, if it is predicted that a large amount of lane deviation is likely to occur, braking is also controlled to suppress the deviation.

Using the map information 44, the planned travel route information 46, and the host vehicle information 48, which are read from the storage device 42, the trajectory generating unit 56 generates a travel trajectory (a time series of target behaviors) in accordance with the action plan created by the action plan creation unit 52. More specifically, the travel trajectory is a time-series data set in which data units thereof are defined by at least position and velocity. Of course, the data units may further include at least one of a position, a posture angle, a velocity, an acceleration, a curvature, a yaw rate, and a steering angle.

The vehicle control unit 60 determines respective vehicle control values in order to control traveling of the vehicle, in accordance with the travel trajectory (time series of target behaviors) generated by the trajectory generating unit 56. In addition, the vehicle control unit 60 outputs the obtained vehicle control values, respectively, to the driving force device 28, the steering device 30, and the braking device 32.

The information acquisition unit 58 acquires information necessary for the process of determining conditions (hereinafter referred to as environmental conditions) in relation to the travel environment of the vehicle. As detailed examples of such necessary information, there may be cited time information (for example, the current time, the time zone, an expected arrival time), geographic information (for example, latitude, longitude, altitude, topography, differences in elevation), and weather information (for example, the weather, temperature, humidity, forecast information).

Figure 2:
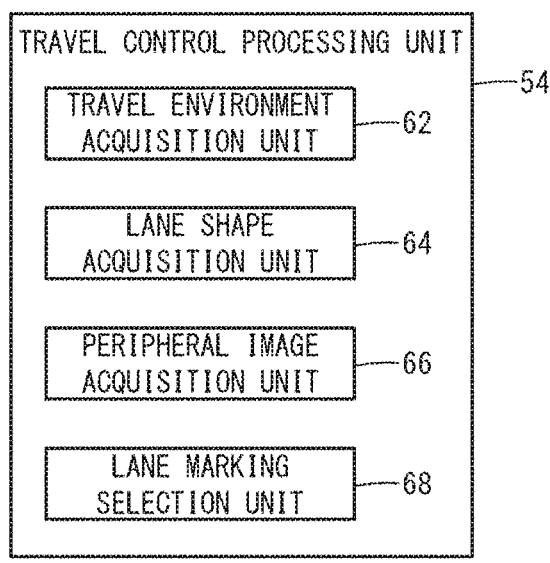
FIG. 2 is a block diagram showing a travel control processing unit.

On the other hand, the travel control processing unit 54 performs a process of transitioning between driving modes, and outputs signals to the action plan creation unit 52 and the notification device 34. More specifically, as shown in FIG. 2, the travel control processing unit 54 functions as a travel environment acquisition unit 62, a lane shape acquisition unit 64, a peripheral image acquisition unit 66, and a lane marking selection unit 68.

The travel environment acquisition unit 62 acquires information concerning the travel environment of the host vehicle 100. Within the travel environment, there are included the most recent recognition results by the external environment recognition unit 50, or acquired information (for example, the aforementioned time information, geographical information, and weather information) from the information acquisition unit 58.

The lane shape acquisition unit 64 acquires lane shape data (route data) of a plurality of lanes of a predetermined region 70 (see FIG. 3) from the map information 44, at a stage at which the host vehicle 100 has arrived at the predetermined region 70 or prior to the host vehicle 100 arriving at the predetermined region 70.

As the predetermined region 70, there may be cited a region, from within a preset planned travel route, in which the number of lanes changes. For example, as shown in FIG. 3, a region may be cited in which a first lane La1 for forward traveling changes into the first lane La1, and a second lane La1, for example, for making a right turn (or a left turn).

As the predetermined region 70, in addition to the example cited above, there may be cited a region in which three or more pieces of image data of a line shape can be recognized. For example, as shown in FIG. 4A, there may be cited a region including a striped zebra zone 74 (buffer zone) in which a plurality of straight lines 72 are arranged in parallel on the road accompanying a lane La, or as shown in FIG. 4B, a region in which a quadrangular marking (diamond marking 76) is drawn on the road accompanying the lane La.

Figure 3:
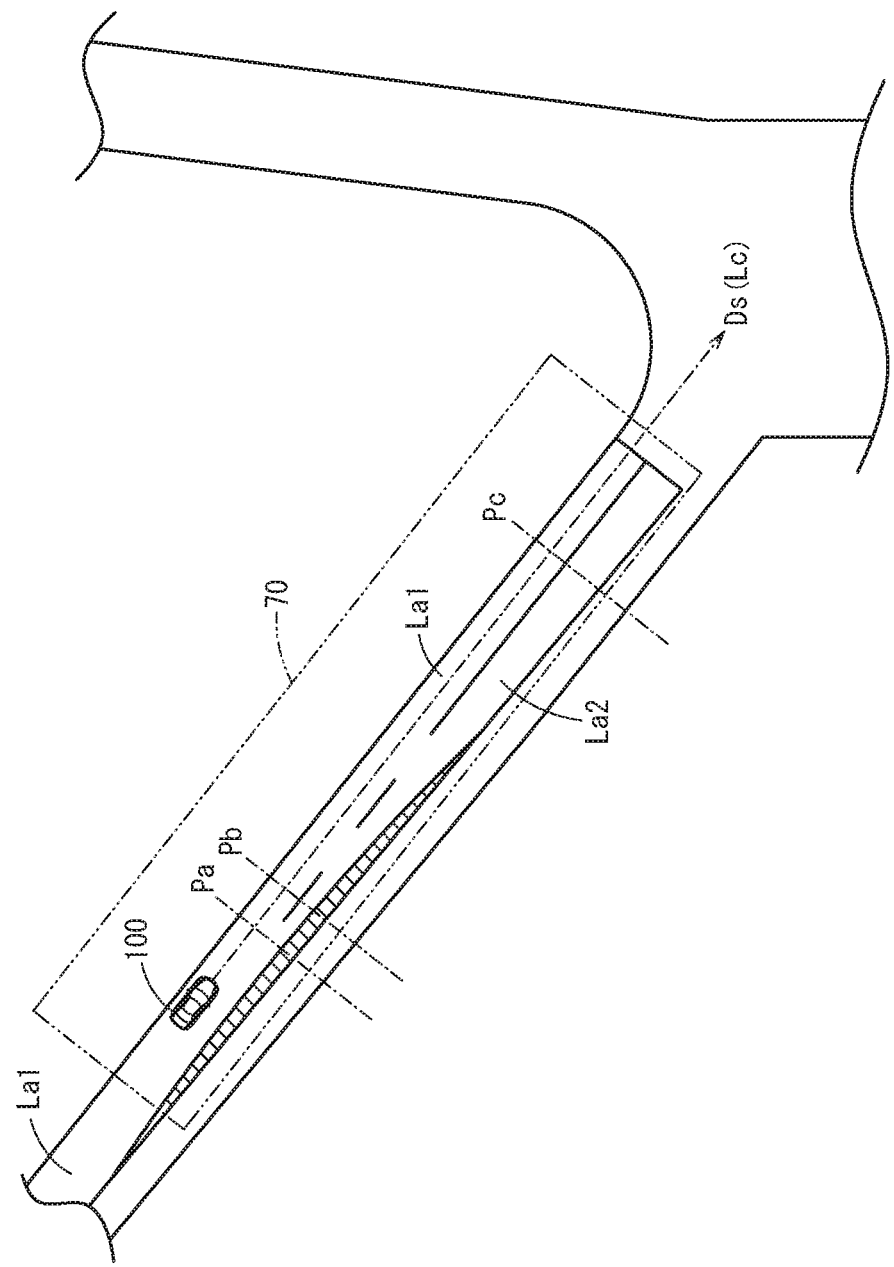
FIG. 3 is a view showing a host vehicle during travel thereof toward a predetermined region.
Figure 4:
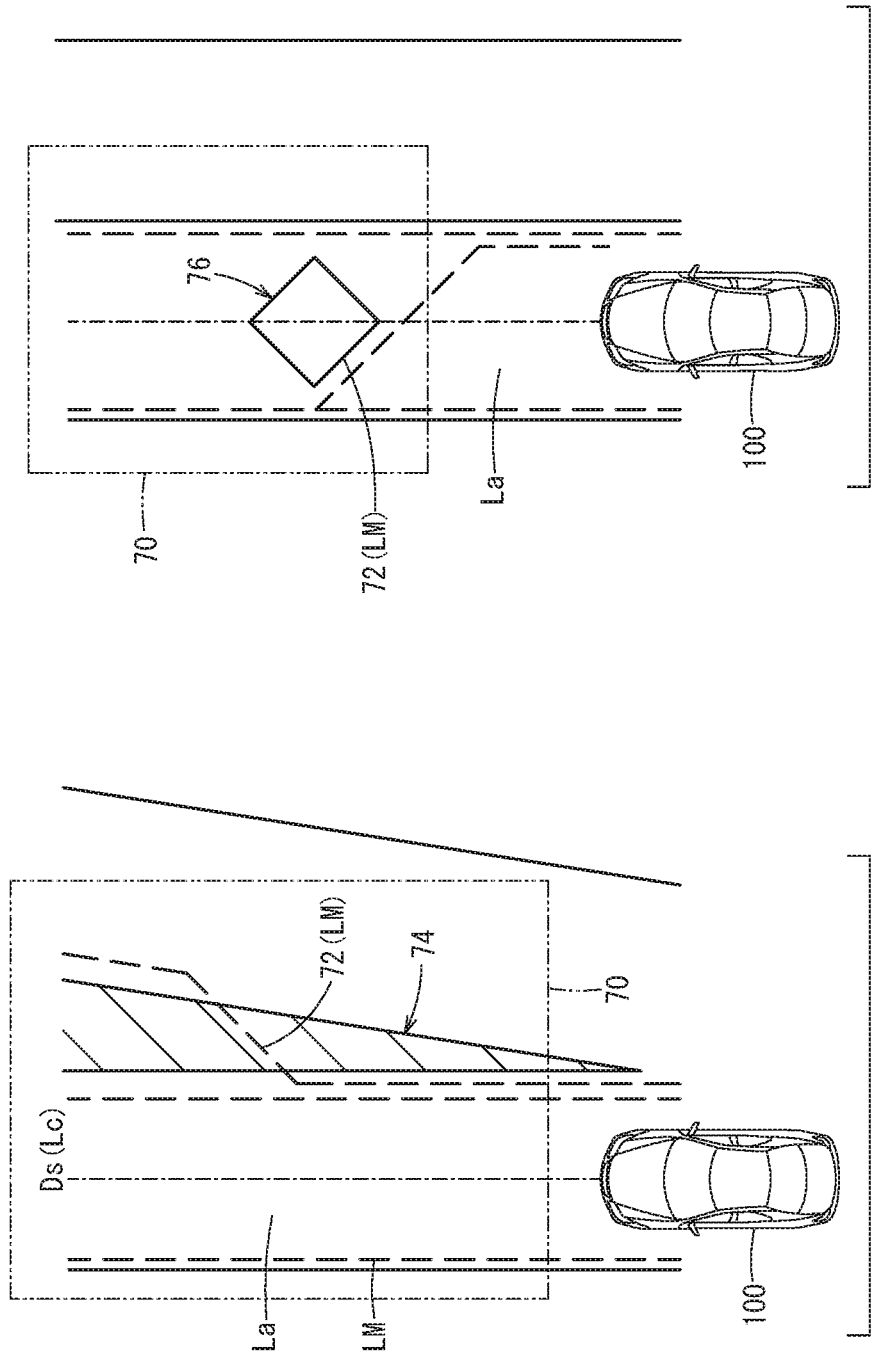
FIG. 4A is a plan view showing an example of a predetermined region having a zebra zone.
FIG. 4B is a plan view showing an example of a predetermined region having a diamond marking.

As a representative example of the shape data (route data) Ds of the lanes La, a center line Lc of one lane and the like can be cited, as shown in FIGS. 3, 4A and 4B.

In addition, with the zebra zone 74 in FIG. 4A, there is a concern of erroneously recognizing, from within the plurality of straight lines 72 that make up the zebra zone 74, one of the straight lines 72 as a lane marking LM, in addition to the lane markings LM that lie along the shape data Ds. In the diamond marking 76 shown in FIG. 4B as well, there is also a concern of erroneously recognizing one straight line 72 among the plurality of straight lines 72 that make up the diamond marking 76, as a lane marking LM.

Figure 5:
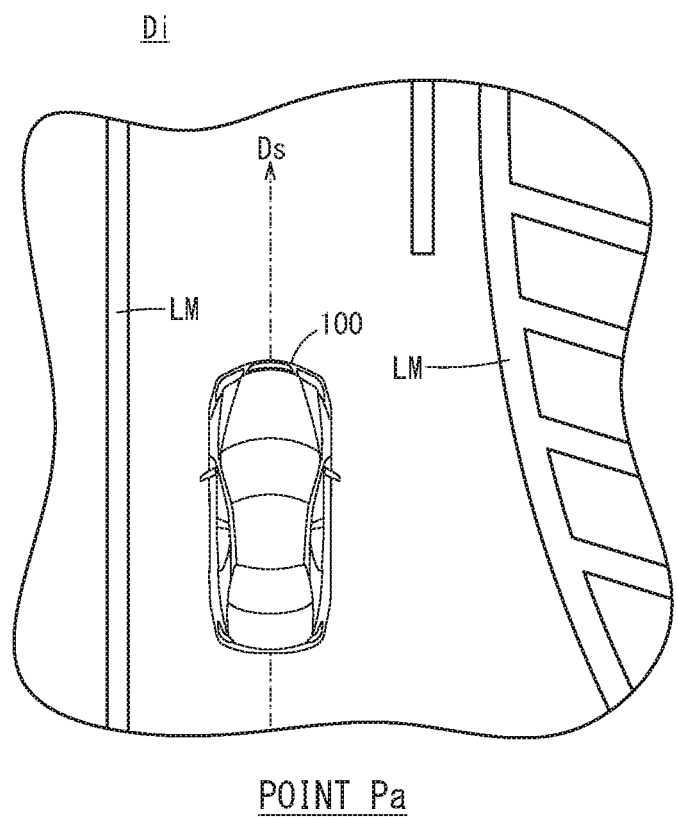
FIG. 5 is a plan view showing peripheral image data corresponding to the point Pa in FIG. 3 (the display of the host vehicle is shown as a reference)

At least when the host vehicle 100 has entered into the predetermined region 70, the peripheral image acquisition unit 66 acquires peripheral image data Di including the lane markings LM of the predetermined region 70 (see FIGS. 5, 6A and 6B) through the cameras 38 of the external environment sensors 14. The peripheral image data Di includes images (captured images) captured by the cameras 38, and bird's eye view images (referred to as BEV images) obtained after having converted the captured images into a bird's eye view (BEV) format. FIG. 5, FIG. 6A, and FIG. 6B show examples of the peripheral image data Di. The image of the host vehicle 100 is shown only as a reference, and such an image is not rendered in the actual image data Di.

The lane marking selection unit 68 collates (aligns) the acquired lane shape data Ds with the peripheral image data Di, and within the peripheral image data Di, selects the lane markings LM to be used at least for lane keeping.

Concerning the lane marking selection unit 68, some specific examples thereof will now be described with reference to FIGS. 7 and 8.

Figure 7:
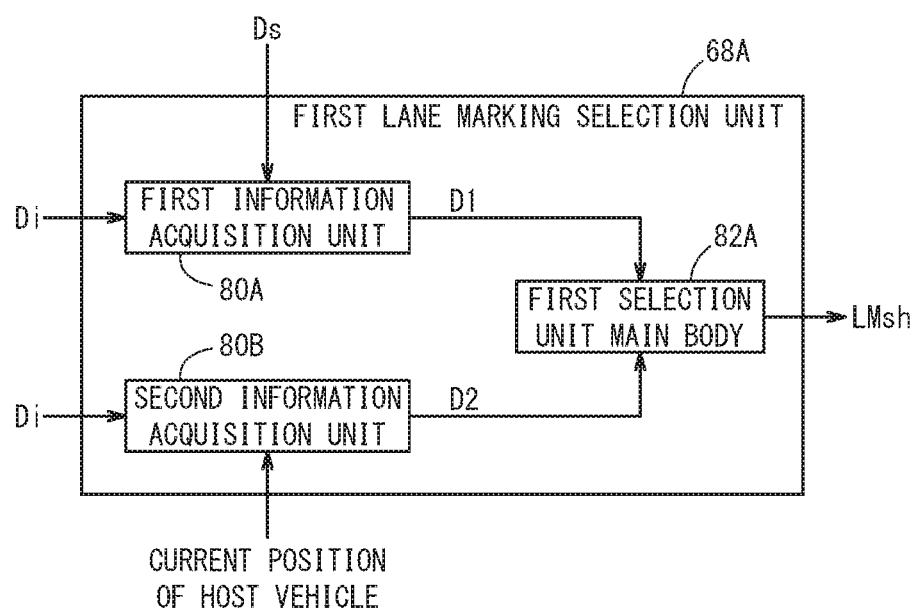
FIG. 7 is a block diagram showing a configuration of a first lane marking selection unit.

As shown in FIG. 7, a lane marking selection unit (first lane marking selection unit 68A) according to a first specific example includes a first information acquisition unit 80A, a second information acquisition unit 80B, and a first selection unit main body 82A.

On the basis of the peripheral image data Di acquired by the peripheral image acquisition unit 66, the first information acquisition unit 80A acquires as first information D1 a combination of the number of lane markings LM on the left side of the shape data Ds in the predetermined region 70 and the number of lane markings LM on the right side of the shape data Ds in the predetermined region 70.

On the basis of the peripheral image data Di acquired by the peripheral image acquisition unit 66, the second information acquisition unit 80B acquires as second information D2 a combination of the number of lane markings LM on the left side and the number of lane markings LM on the right side, of the host vehicle 100 (at the current position thereof) in the predetermined region 70.

In addition, in the case that the first information D1 and the second information D2 are the same, the first selection unit main body 82A selects, from within the peripheral image data Di, at least one lane marking on both left and right sides of the host vehicle 100 as the lane markings to be used at least for lane keeping. In the case that the first information D1 and the second information D2 are different, the first selection unit main body 82A selects, from within the peripheral image data Di, lane markings closest to the shape data Ds as the lane markings LMsh to be used at least for lane keeping.

A description will now be presented while illustrating one example. For example, as shown in FIG. 3, a case is assumed in which, as the predetermined region 70, there is a road that changes from a single one-way lane into two lanes, including, for example, a first lane La1 for forward traveling or making a left turn, and a second lane La1 for making a right turn, and the shape data Ds along the planned travel route proceeds straight forward along the first lane La1.

Moreover, in the following description, the first information D1 is expressed in a format of <the number of lane markings LM on the left side, the number of lane markings LM on the right side of the shape data Ds in the peripheral image data Di>, whereas the second information D2 is expressed in a format of «the number of lane markings on the left side, the number of lane markings on the right side of the host vehicle 100 in the peripheral image data Di».

In addition, at point Pa in FIG. 3, and more specifically, at a stage at which the host vehicle 100 has entered into the predetermined region 70, the first information becomes <1, 1> and the second information becomes «1, 1». Therefore, as shown in FIG. 5, within the peripheral image data Di, the first selection unit main body 82A selects at least one lane marking LM on both left and right sides of the host vehicle 100 as the lane markings LMsh to be used at least for lane keeping.

Next, at the point Pb in FIG. 3, the first information D1 becomes <1, 2>, however, the second information D2 changes depending on the position of the host vehicle 100. More specifically, as shown in FIG. 6A, after the host vehicle 100 has entered and advanced further into the predetermined region 70 and then comes too close to the right side lane marking, sight of the intermediate lane marking becomes lost at point Pb. In this case, the second information becomes «1, 1» which differs from the first information D1. Therefore, the first selection unit main body 82A selects, from within the peripheral image data Di, lane markings closest to the shape data Ds as the lane markings LMsh to be used at least for lane keeping.

On the other hand, as shown in FIG. 6B, after the host vehicle 100 has entered and advanced further into the predetermined region 70, in the case that the host vehicle 100 proceeds straight forward without coming too close to the right side lane marking, the second information D2 becomes «1, 2» which is the same as the first information D1. In this case, as was described above, the first selection unit main body 82A selects, from within the peripheral image data Di, at least one lane marking on both left and right sides of the host vehicle 100 as the lane markings LMsh to be used at least for lane keeping. The same features also apply at the point Pc shown in FIG. 3.

In the example discussed above, although a case was assumed in which the shape data Ds proceeds straight forward along the first lane La1, the same situation also holds true in the case that the shape data Ds turns to the right along the second lane La1. Of course, in addition thereto, including the case of turning to the left as well, the same processing can be performed in order to select the appropriate lane markings.

Figure 8:
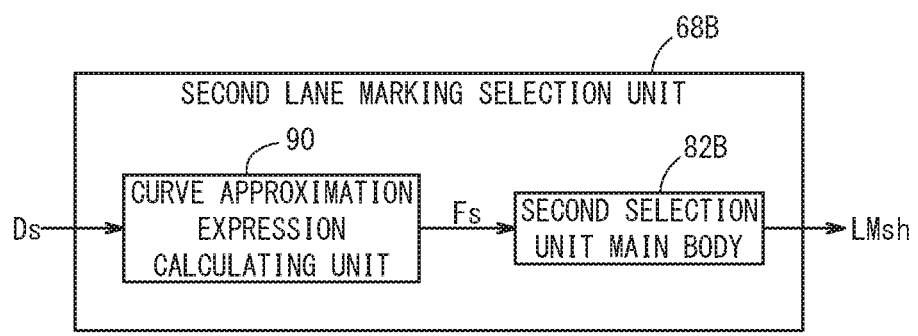
FIG. 8 is a block diagram showing a configuration of a second lane marking selection unit.

Next, as shown in FIG. 8, a lane marking selection unit (second lane marking selection unit 68B) according to a second specific example includes a curve approximation expression calculating unit 90, and a second selection unit main body 82B.

The curve approximation expression calculating unit 90 calculates a curve approximation expression Fs of the shape data Ds in the predetermined region 70.

On the basis of the degree of the curve approximation expression Fs obtained by the curve approximation expression calculating unit 90, from within the peripheral image data Di, the second selection unit main body 82B selects the lane markings to be used at least for lane keeping. In this case, a BEV image is preferably adopted as the peripheral image data Di.

For example, if the degree is 0 or 1, straight line lane markings are selected, if the degree is 2, lane markings of a simple right or left turn lane are selected, and if the degree is 3, for example, lane markings of a lane for making a right or left turn after changing lanes are selected.

Next, representative first processing operations and second processing operations of the vehicle control device 10 according to the present embodiment will be described with reference to FIGS. 9 through 12.

Figure 9:
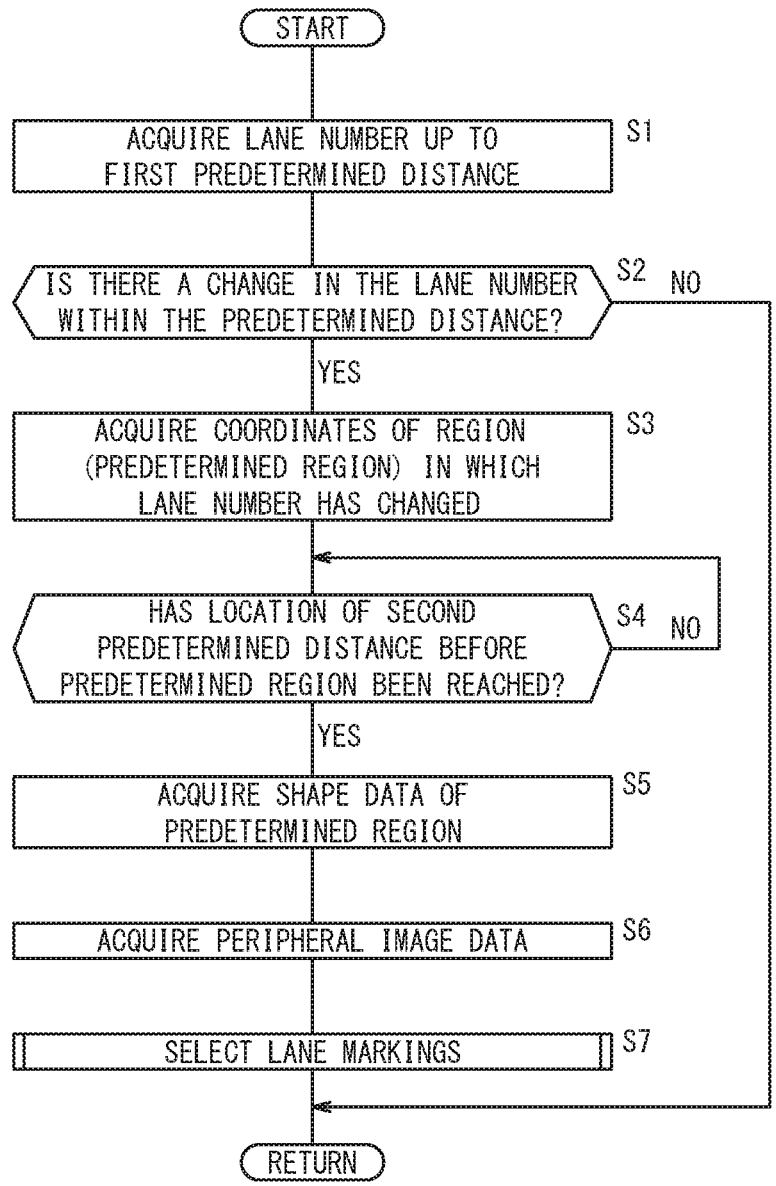
FIG. 9 is a flowchart showing first processing operations of the vehicle control device according to the present embodiment.

Initially describing the first processing operations, first, in step S1 of FIG. 9, the lane shape acquisition unit 64 acquires the lane information (expressed as number of lanes: lane number) up to a first predetermined distance on the planned travel route from the current position of the host vehicle 100. The first predetermined distance may be, for example, a value from 500 to 1000 m.

In step S2, based on the acquired lane information, the lane shape acquisition unit 64 determines whether or not there is a location in which the lane number changes within the predetermined distance. If there is a region in which the lane number has changed (step S2: YES), the process proceeds to step S3, whereupon the lane shape acquisition unit 64 acquires coordinates of the region (predetermined region 70) in which the lane number has changed.

In step S4, on the basis of the acquired coordinates of the predetermined region 70 and the coordinates of the host vehicle 100 during traveling, the lane shape acquisition unit 64 determines whether or not the host vehicle 100 has reached a second predetermined distance before the predetermined region 70. The second predetermined distance may be, for example, a value from 50 to 500 m.

In addition, at a stage at which the host vehicle 100 has reached the second predetermined distance before the predetermined region 70 (step S4: YES), the process proceeds to step S5, whereupon the lane shape acquisition unit 64 acquires the lane shape data Ds of the predetermined region 70.

Thereafter, in step S6, the peripheral image acquisition unit 66 acquires the peripheral image data Di including the lane markings of the predetermined region 70 through the cameras 38 of the external environment sensors 14.

In step S7, processing by the lane marking selection unit 68 is entered into. In this instance, processing performed in the case that either one of the first lane marking selection unit 68A and the second lane marking selection unit 68B is adopted as the lane marking selection unit 68 will be described with reference to FIGS. 10 and 11.

Figure 10:
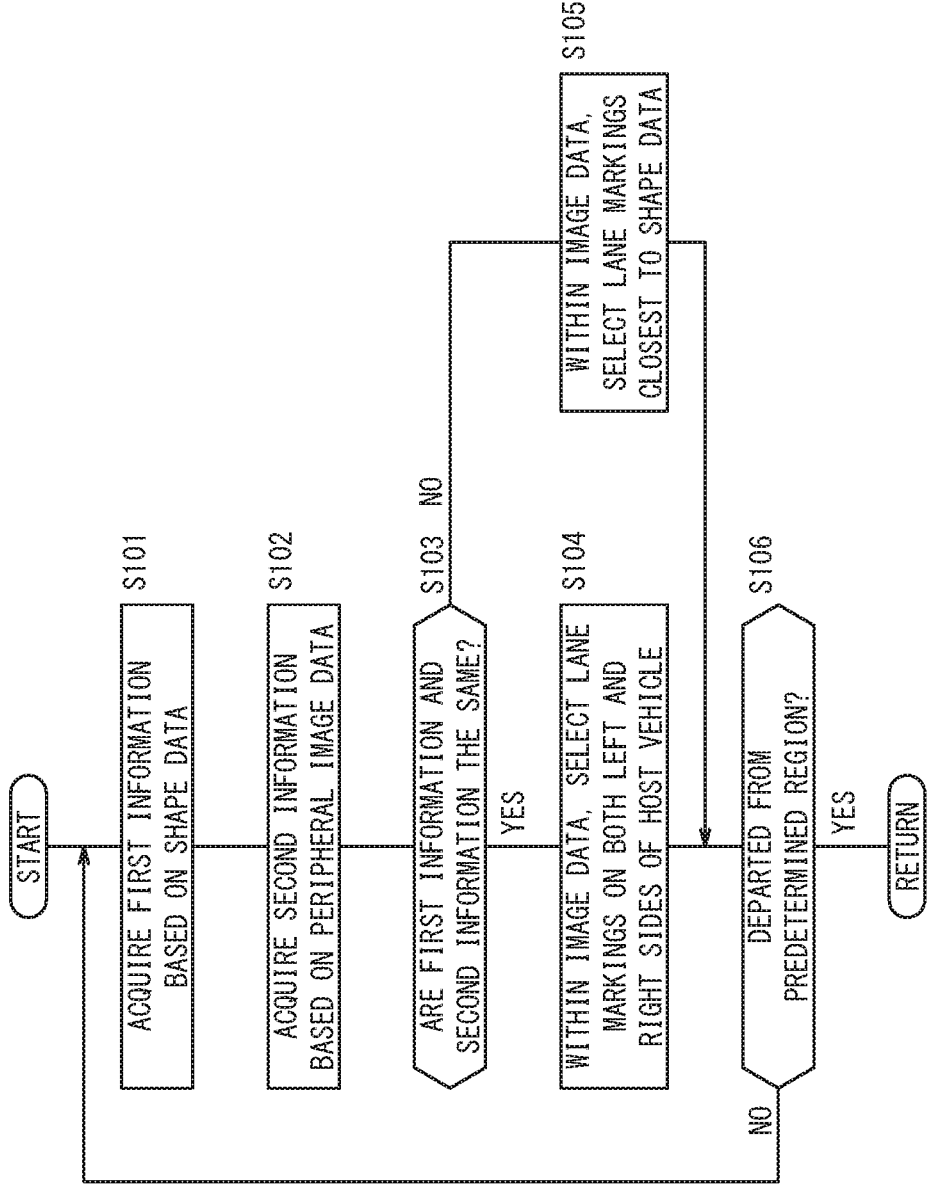
FIG. 10 is a flowchart showing processing operations of the first lane marking selection unit.

First, in the case that the first lane marking selection unit 68A is adopted as the lane marking selection unit 68, the process proceeds to step S101 of FIG. 10. In step S101, on the basis of the shape data Ds of at least one lane acquired by the lane shape acquisition unit 64, the first information acquisition unit 80A of the first lane marking selection unit 68A acquires, as the first information D1, within the preset planned travel route, a combination of the number of lane markings on the left side of the host vehicle 100 in the predetermined region 70 and the number of lane markings on the right side thereof.

In step S102, on the basis of the peripheral image data Di acquired by the peripheral image acquisition unit 66, the second information acquisition unit 80B acquires, as the second information D2, a combination of the number of lane markings on the left side and the number of lane markings on the right side, of the host vehicle 100 in the predetermined region 70.

In step S103, the first selection unit main body 82A determines whether or not the first information D1 and the second information D2 are the same. If they are the same (step S103: YES), the process proceeds to step S104, whereupon the first selection unit main body 82A selects, from within the peripheral image data Di, at least one lane marking on both left and right sides of the host vehicle 100 as the lane markings to be used at least for lane keeping.

In the above-described step S103, in the case that the first information D1 and the second information D2 are different (step S103: NO), the process proceeds to step S105, whereupon the first selection unit main body 82A selects, from within the peripheral image data Di, lane markings closest to the shape data Ds as the lane markings to be used at least for lane keeping.

Thereafter, in step S106, the first selection unit main body 82A determines whether or not the host vehicle 100 has departed from the predetermined region 70. If the host vehicle has not departed from the predetermined region 70 (step S106: NO), the process returns to the aforementioned step S101, and step S101 and the steps subsequent thereto are repeated. In addition, in the aforementioned step S106, at a stage at which it has been determined that the host vehicle 100 has departed from the predetermined region 70 (step S106: YES), the processing performed by the first lane marking selection unit 68A is temporarily brought to an end.

Figure 11:
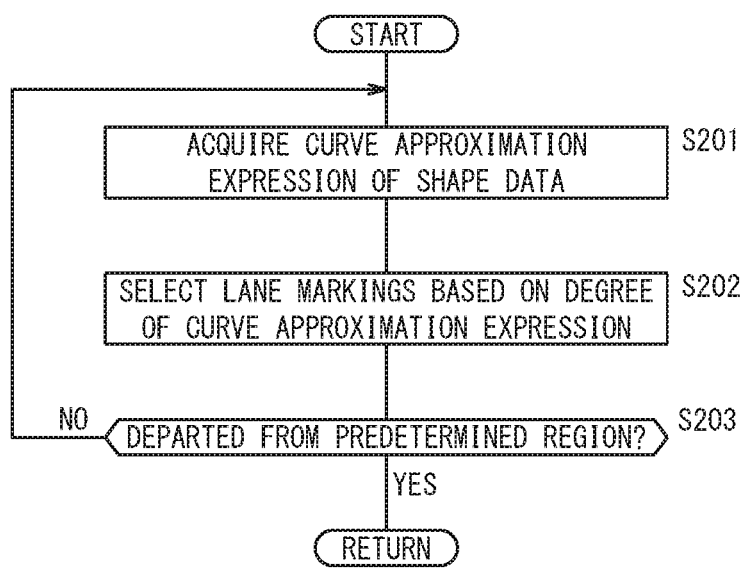
FIG. 11 is a flowchart showing processing operations of the second lane marking selection unit.
Figure 12:
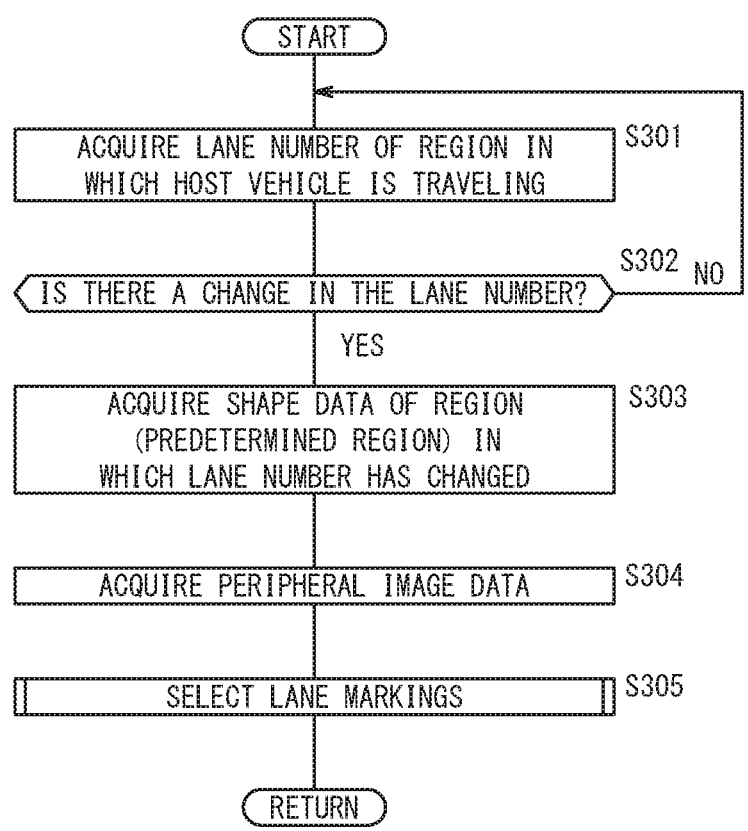
FIG. 12 is a flowchart showing second processing operations of the vehicle control device according to the present embodiment.

Next, in the case that the second lane marking selection unit 68B is adopted as the lane marking selection unit 68, the process proceeds to step S201 of FIG. 11. In step S201, the curve approximation expression calculating unit 90 of the second lane marking selection unit 68B acquires the curve approximation expression Fs of the shape data Ds from the shape data Ds in the predetermined region 70.

In step S202, on the basis of the degree of the curve approximation expression Fs obtained by the curve approximation calculating unit 90, from within the peripheral image data Di, the second selection unit main body 82B selects the lane markings to be used at least for lane keeping. In such a selection, as was described above, for example, if the degree is 0 or 1, straight line lane markings are selected; if the degree is 2, lane markings of a simple right or left turn lane are selected; and if the degree is 3, for example, lane markings of a lane for making a right or left turn after changing lanes are selected.

Thereafter, in step S203, the second selection unit main body 82B determines whether or not the host vehicle 100 has departed from the predetermined region 70. If the host vehicle has not departed from the predetermined region 70 (step S203: NO), the process returns to the aforementioned step S201, and step S201 and the steps subsequent thereto are repeated. In addition, in the aforementioned step S203, at a stage at which it has been determined that the host vehicle 100 has departed from the predetermined region 70 (step S203: YES), the processing performed by the second lane marking selection unit 68B is temporarily brought to an end.

As shown in FIG. 9, at a stage at which the process of the aforementioned step S7 is completed in the lane marking selection unit 68, or alternatively, in the case it is determined in step S2 that the predetermined region 70 does not lie within the predetermined distance (step S2: NO), then after the elapse of a fixed time period, the process returns to step S1.

Next, a description will be given of the second processing operations. First, in step S301 of FIG. 12, while the host vehicle 100 is traveling, the lane shape acquisition unit 64 acquires the lane number of the region in which the host vehicle is traveling.

In step S302, the lane shape acquisition unit 64 determines whether or not the lane number acquired at the present time differs from the lane number that was acquired previously, or stated otherwise, whether or not the lane number has changed. If the lane number has not changed (step S302: NO), the process returns to step S301, and step S301 and the steps subsequent thereto are repeated.

In the case it is determined in the aforementioned step S302 that the lane number has changed, or stated otherwise, in the case it is determined that the predetermined region 70 has been reach (step S302: YES), the process proceeds to the following step S303, whereupon the lane shape acquisition unit 64 acquires the lane shape data Ds of the predetermined region 70.

In step S304, the peripheral image acquisition unit 66 acquires the peripheral image data Di including the lane markings of the predetermined region 70 through the cameras 38 of the external environment sensors 14.

In step S305, processing by the lane marking selection unit 68 is entered into. Since the processing by the lane marking selection unit 68 is similar to the processing performed in the above-described step S7 (see FIGS. 10 and 11), redundant descriptions thereof will be omitted.

In addition, as shown in FIG. 9, at a stage at which processing by the lane marking selection unit 68 is completed, after the elapse of a fixed time period, the process returns to step S301.

In the foregoing manner, the vehicle control device 10 according to the present embodiment is a vehicle control device configured to carry out a travel control for the host vehicle 100 at least partially automatically, including the lane shape acquisition unit 64 configured to acquire, within a preset planned travel route, lane shape data (route data) Ds of the lanes La of the predetermined region 70 from the map information 44, at a stage at which the host vehicle 100 has arrived at the predetermined region 70 or prior to the host vehicle 100 arriving at the predetermined region 70, the peripheral image acquisition unit 66 configured to acquire peripheral image data Di including the lane markings LM of the predetermined region 70, and the lane marking selection unit 68 configured to collate (align) the acquired lane shape data Ds of the lanes La with the peripheral image data Di, and to select, from within the peripheral image data Di, the lane markings LMsh to be used at least for lane keeping.

For example, at an intersection, with respect to a lane in which the vehicle is intended to travel, when lane markings are recognized by a camera, if there are a plurality of branching lanes and the shapes (paths) of the lanes are complicated, cases occur in which it is impossible to identify and recognize the lane intended for travel. However, according to the present embodiment, when the host vehicle 100 arrives at the predetermined region 70 or prior to the host vehicle 100 arriving at the predetermined region 70, the lane shape data Ds of the predetermined region 70 is acquired from the map information 44, and the peripheral image data Di is acquired including the plurality of lane markings LM of the predetermined region 70. In addition, the acquired lane shape data Ds is collated with the peripheral image data Di, and from within the peripheral image data Di, the lane markings LMsh to be used at least for lane keeping are selected. More specifically, the predetermined planned travel route, and namely, the lane markings LMsh along the lane intended for travel are selected. Consequently, even if a plurality of branching lanes exist and the shapes of the lanes are complicated, it is possible to identify and recognize the lane markings LMsh to be used at least for lane keeping.

Incidentally, striped zebra zones 74 (buffer zones) in which a plurality of straight lines are arranged in parallel, and a quadrangular marking (diamond marking 76) are drawn on the road accompanying the lanes in certain cases. In such a case, there is a concern that the path of the vehicle may deviate from the planned travel route by mistaken recognition of one of the straight lines constituting the zebra zone 74 or one of the straight lines constituting the diamond markings 76 as a lane marking LM.

Even in such a case, since the acquired lane shape data Ds is collated with the peripheral image data Di, and from within the peripheral image data Di, the lane markings LMsh along the lane intended for travel are selected, even if there is misleading straight line data in the peripheral image data Di, it is possible to identify and recognize only the lane markings LMsh to be used at least for lane keeping. Consequently, it is possible to enhance the merchantability of vehicles that carry out a travel control for the host vehicle at least partially automatically.

In the present embodiment, the lane marking selection unit 68 includes the first information acquisition unit 80A configured to, based on the peripheral image data Di, acquire, as first information D1, a combination of the number of lane markings on the left side of the shape data Ds in the predetermined region 70 and the number of lane markings on the right side of the shape data Ds in the predetermined region 70, and the second information acquisition unit 80B configured to, based on the peripheral image data Di, acquire, as second information D2, a combination of the number of lane markings on the left side of the host vehicle 100 in the predetermined region 70 and the number of lane markings on the right side of the host vehicle 100 in the predetermined region 70. In the case that the first information D1 and the second information D2 are the same, the lane marking selection unit 68 selects, from within the peripheral image data Di, at least one of the lane markings on both left and right sides of the host vehicle 100 as the lane markings LMsh to be used at least for lane keeping, and in the case that the first information D1 and the second information D2 are different, the lane marking selection unit 68 selects, from within the peripheral image data Di, at least one of lane markings closest to the shape data Ds as the lane markings LMsh to be used at least for lane keeping.

In selecting the lane markings LMsh, since it is possible to select the lane markings LMsh to be used at least for lane keeping on the basis of the combination of the numbers of lane markings LM, and without directly using information composed of a large amount of data such as image data, even with a complicated lane structure having a plurality of lanes La, the search for the lane markings can be effected at high speed.

In the present embodiment, a planned travel route along which the host vehicle 100 travels is set in advance, and the lane marking selection unit 68 selects, from within the peripheral image data Di, the lane markings LMsh to be used for lane-marking searching on the basis of the degree of a curve approximation expression Fs of the shape data Ds in the predetermined region 70.

In accordance with this feature, it is possible to easily determine the course (a left turn, a right turn, forward traveling, etc.) of the lane intended for travel, without directly using information composed of a large amount of data such as the image data Di, and therefore, even with a complicated lane structure having a plurality of lanes, the search for the lane markings can be effected at high speed.

In the present embodiment, the predetermined region 70 in which the host vehicle 100 travels is a region in which three or more pieces of image data of a line shape can be recognized.

More specifically, as the region (predetermined region 70) in which three or more pieces of image data of a line shape can be recognized, there may be cited, for example, two lane markings for forward traveling, and one lane marking for making a right turn, or the like.

In addition, in the present embodiment, for example, in the case that the host vehicle 100 should travel straight forward, two lane markings (image data) for forward traveling can be selected without erroneously recognizing lane markings (image data) for making a right turn as the lane markings (image data) for forward traveling. This feature applies in a similar manner to a case in which the host vehicle 100 makes a right turn, or a case in which the host vehicle 100 makes a left turn.

As other examples of the predetermined region 70, as described above, there may be cited regions in which the striped zebra zones 74, or the quadrangular diamond markings 76 are drawn. Even in the case of such a predetermined region 70, the acquired lane shape data Ds is collated with the peripheral image data Di, and within the peripheral image data Di, lane markings along the lane intended for travel are selected as the lane markings LMsh to be used at least for lane keeping. Consequently, even if there are image data of misleading line shapes in the peripheral image data Di, it is possible to identify and recognize only the lane markings LMsh to be used at least for lane keeping. As a result, it is possible to enhance the merchantability of vehicles that carry out a travel control for the host vehicle 100 at least partially automatically.

In the present embodiment, the lane shape acquisition unit 64 recognizes, as the predetermined region 70, a region in which the number of lanes changes within the preset planned travel route, and acquires the lane shape data Ds in the predetermined region 70 from the map information 44 prior to the host vehicle 100 arriving at the predetermined region 70.

From the fact that the shape data Ds is acquired prior to reaching the predetermined region 70, it is possible to implement the selection process for selecting the lane markings LMsh to be used at least for lane keeping from a point in time of having entered into the predetermined region 70. In particular, such a feature is advantageous in the case of acquiring a curve approximation expression Fs of the shape data Ds or the like.

In the present embodiment, while the host vehicle 100 is traveling, the lane shape acquisition unit 64 acquires, from the map information 44, information of the number of lanes of a region in which the host vehicle is traveling, and at a stage at which the number of lanes has changed, recognizes that the host vehicle 100 has arrived at the predetermined region 70, and acquires the lane shape data Ds of the predetermined region 70 from the map information 44.

The predetermined region 70 is identified while acquiring the information of the number of lanes of the region in which the host vehicle is traveling, and therefore, the amount of communications performed each and every time until arriving at the predetermined region 70 can be reduced, and the computation time can also be shortened.

The present invention is also applicable to a case in which a vehicle travels on the right side of the road.

The present invention is not limited to the embodiment described above, and it goes without saying that the present invention can be freely modified within a range that does not depart from the scope of the present invention.

What is claimed is:

1. A vehicle control device configured to carry out a travel control for a host vehicle at least partially automatically, comprising:

a lane shape acquisition unit configured to acquire, within a preset planned travel route, lane shape data of a lane of a predetermined region from map information, at a stage at which the host vehicle has arrived at the predetermined region or prior to the host vehicle arriving at the predetermined region;

a peripheral image acquisition unit configured to acquire peripheral image data including lane markings of the predetermined region; and a lane marking selection unit configured to collate the acquired lane shape data with the peripheral image data, and to select, from within the peripheral image data, lane markings to be used at least for lane keeping, wherein the lane marking selection unit comprises:

a first information acquisition unit configured to, based on the peripheral image data, acquire, as first information, a combination of a number of the lane markings on a left side of the lane shape data in the predetermined region and a number of the lane markings on a right side of the lane shape data in the predetermined region; and a second information acquisition unit configured to, based on the peripheral image data, acquire, as second information, a combination of a number of the lane markings on a left side of the host vehicle in the predetermined region and a number of the lane markings on a right side of the host vehicle in the predetermined region;

wherein, in a case that the first information and the second information are same, the lane marking selection unit selects, from within the peripheral image data, at least one of the lane markings on both the left and right sides of the host vehicle as the lane markings to be used at least for lane keeping;

in a case that the first information and the second information are different, the lane marking selection unit selects, from within the peripheral image data, at least one of lane markings closest to the lane shape data as the lane markings to be used at least for lane keeping, and the lane shape data in the predetermined region represent a center line of a lane extending along the preset planned travel route.

2. The vehicle control device according to claim 1, wherein the predetermined region in which the host vehicle travels is a region in which three or more pieces of image data of a line shape can be recognized.

3. The vehicle control device according to claim 1, wherein the lane shape acquisition unit recognizes, as the predetermined region, a region in which a number of lanes changes within the preset planned travel route, and acquires the lane shape data in the predetermined region from the map information prior to the host vehicle arriving at the predetermined region.

4. The vehicle control device according to claim 1, wherein, while the host vehicle is traveling, the lane shape acquisition unit acquires, from the map information, information of a number of lanes of a region in which the host vehicle is traveling, and at a stage at which the number of the lanes has changed, recognizes that the host vehicle has arrived at the predetermined region, and acquires the lane shape data of the predetermined region from the map information.

5. A vehicle control device configured to carry out a travel control for a host vehicle at least partially automatically, comprising:

a lane shape acquisition unit configured to acquire, within a preset planned travel route, lane shape data of a lane of a predetermined region from map information, at a stage at which the host vehicle has arrived at the predetermined region or prior to the host vehicle arriving at the predetermined region;

a peripheral image acquisition unit configured to acquire peripheral image data including lane markings of the predetermined region; and a lane marking selection unit configured to collate the acquired lane shape data with the peripheral image data, and to select, from within the peripheral image data, lane markings to be used at least for lane keeping wherein the lane marking selection unit selects, from within the peripheral image data, the lane markings to be used at least for lane keeping, based on a degree of a curve approximation expression of the lane shape data in the predetermined region, and the lane shape data in the predetermined region represent a center line of a lane extending along the preset planned travel route.

6. The vehicle control device according to claim 5, wherein the predetermined region in which the host vehicle travels is a region in which three or more pieces of image data of a line shape can be recognized.

7. The vehicle control device according to claim 5, wherein the lane shape acquisition unit recognizes, as the predetermined region, a region in which a number of lanes changes within the preset planned travel route, and acquires the lane shape data in the predetermined region from the map information prior to the host vehicle arriving at the predetermined region.

8. The vehicle control device according to claim 5, wherein, while the host vehicle is traveling, the lane shape acquisition unit acquires, from the map information, information of a number of lanes of a region in which the host vehicle is traveling, and at a stage at which the number of the lanes has changed, recognizes that the host vehicle has arrived at the predetermined region, and acquires the lane shape data of the predetermined region from the map information.

\* \* \* \* \*